H. STEINWAY, Jr.
Pianoforte Action.
No. 1,271. Reissued Feb. 4, 1862.
Fig. 1
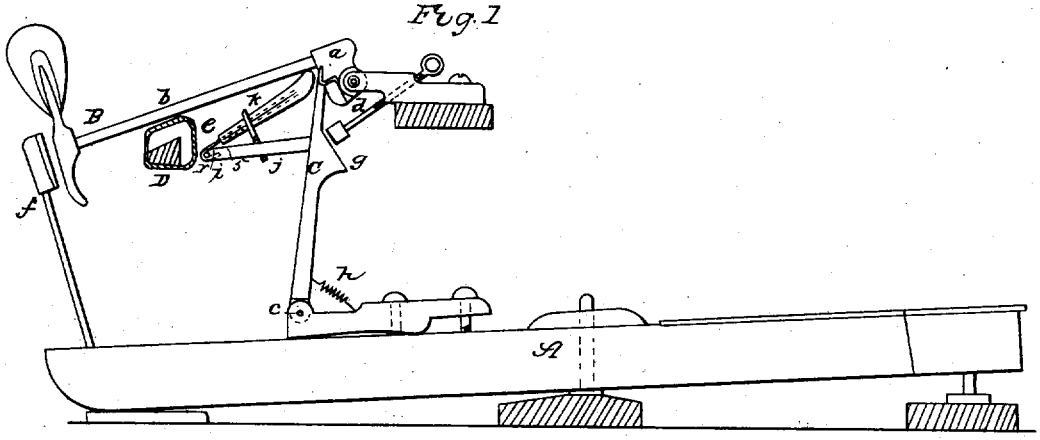
Fig. 2
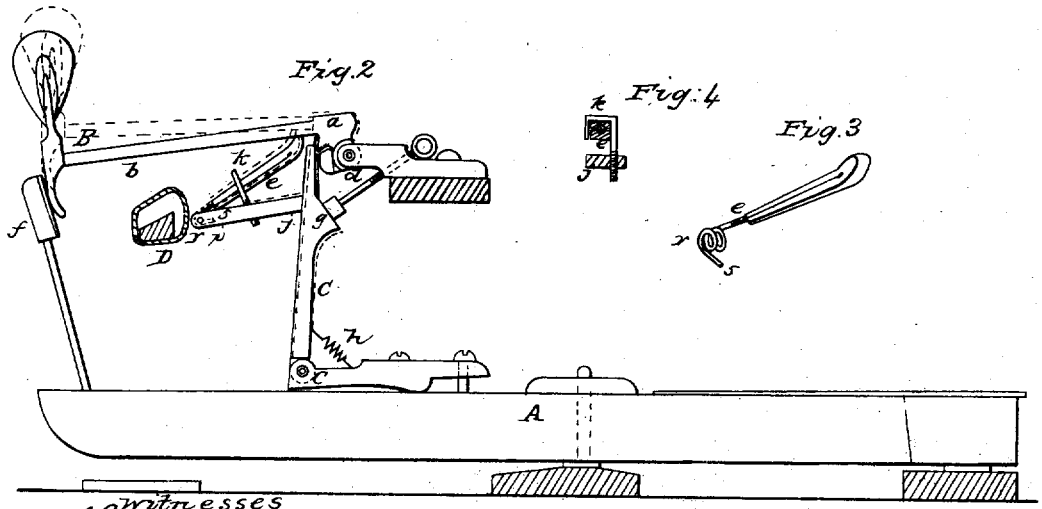
Fig. 4
Fig. 3
Witnesses
Louis A. Tucker
C. W. Livingston
Inventor
H. Steinway jr
by
N. PETERS, Photo-Lithographer, Washington, D. C.

UNITED STATES PATENT OFFICE.

HENRY STEINWAY, JR., OF NEW YORK, N. Y.

IMPROVEMENT IN PIANO-FORTE ACTIONS.

Specification forming part of Letters Patent No. 20,595, dated June 15, 1858; Reissue No. 1,271, dated February 4, 1862.

*To all whom it may concern:*

Be it known that I, HENRY STEINWAY, Jr., of the city, county, and State of New York, have invented a new and useful Improvement in Piano-forte-Actions; and I do hereby declare that the following is a full, clear, and exact description of the same, reference being had to the accompanying drawings, forming part of this specification, in which—

Figure 1 is a side view of an action with my improvement, exhibiting it at rest. Fig. 2 is a similar view exhibiting it with the key depressed. Fig. 3 is a perspective view of the repeating-lever and its spring detached from the action. Fig. 4 is a transverse section of the repeating-lever, which constitutes the principal feature of my invention.

Similar letters of reference indicate corresponding parts in the several figures.

The object of my invention is to provide for the instantaneous return of the jack to its notch in the hammer, but after the hammer has struck the string, for the purpose of enabling a quick repetition of the blow to be given, by a contrivance operating with less friction than the sliding post and its appendages, which are the subject-matter of Letters Patent of the United States granted to me May 5, 1857. The invention consists, chiefly, in a repeating-lever applied to the jack and operating under the control of a spring, as hereinafter described.

To enable others skilled in the art to make and use my invention, I will proceed to describe its construction and operation.

A is the key. B is the hammer, having its butt *a* formed as in what is known as the "French action." The shank *b* of the hammer has its under side made flat near the butt. D is the rest-rail. C is the jack working on the pin *c*, which connects it with the key. This jack is made without the heel, with which the jack of the so-called "French action" is constructed, and instead of such heel has an inclined protuberance, *g*, on its front side for the regulating-screw *d* to act upon to throw its point out of the notch in the hammer-butt and permit the escape of the hammer.

The regulating-screw *d* is applied in an inclined position in front of the jack. *h* is the jack-spring, and *f* is the back-check, both applied in the common way. *s* is the string.

*e* is the repeating-lever attached, by a pin, *i*, which constitutes its fulcrum, to an arm, *j*, which is secured rigidly to the back of the jack at a short distance from the point thereof; and *r* is the spring which controls the operation of said lever. This lever and spring are represented as made of a single piece of steel wire, of which the portion constituting the lever is made straight, or nearly so, and covered with a flat strip of leather, felt, or other soft material, which extends around its extremity to form a soft bearing for the flat portion of the hammer-shank near the butt, and the portion constituting the spring is coiled. The coil is inserted in a mortise in the end of the arm *j*, and the pin *i* passes transversely through the arm *j*, and the eye of the coil. The end 5 of the wire next the coil is inserted in a notch or hole in the arm *j*, to make the coil operate as a spring for the purpose of forcing the lever upward toward the hammer-shank. The distance to which the lever is allowed to move upward is regulated by a hooked screw, *k*, which screws into the arm *j*.

The operation of the action is as follows: When the key is at rest, as shown in Fig. 1, the point of the jack is held in the notch of the hammer-butt by the spring *h*, and the lever *e* scarcely touches, or, at any rate, presses very lightly against the shank of the hammer. When the front end of the key is struck in playing, the jack acts in the notch of the hammer butt in the usual manner, and then is caused to escape by the action of the block *g* against the regulating-screw *d*. When the hammer falls after striking the string forcibly, it descends far enough to be caught by the back-check, and by the force of the recoil and the momentum of its fall acting on the repeating-lever the upward pressure of the said lever produced by the spring *r* is overcome and the said lever is to some extent depressed relatively to the jack, as shown in black outline in Fig. 2; but as soon as the playing end of the key is permitted to rise in the slightest degree the hammer is liberated by the back check and the lever *e* is caused by the action of the spring *r* to lift up the hammer nearer to the string, as shown in red outline in Fig. 2, and thus to bring the notch in the butt high enough for the point of the jack to fall partly into it, so that a very little farther rise of the playing end of the key will permit the said point to be forced far enough into the notch to enable the blow to be repeated. When the key is struck very softly by the player, the recoil of the hammer will not be sufficient to carry it down to the back-check, but the hammer will be arrested by the lever *e* very near the string, so that after a light as after a heavy blow the repetition can be effected by permitting the key to rise a very short distance. The screw *k* permits the adjustment of the lever *e* to make it support the hammer higher or lower. The hooked head of the said screw requires the lever to be pressed down by hand out of its way before it can be turned to adjust or regulate the upward movement of the lever.

What I claim as my invention, and desire to secure by Letters Patent, is—

1. The repeating-lever *e*, attached to an arm, *j*, at the back of the jack, and arranged relatively to the hammer and operating under the control of a spring, substantially as herein described, for the purpose set forth.

2. The employment, in combination with the so-applied repeating-lever of a screw, *k*, applied to operate substantially as and for the purpose set forth.

H. STEINWAY, JR.

Witnesses:
JAMES LAIRD,
M. M. ZIVINGSTON.